(12) United States Patent
Mori et al.

(10) Patent No.: US 10,682,004 B2
(45) Date of Patent: Jun. 16, 2020

(54) BEVERAGE MACHINE WITH A COVER FOR AN INGREDIENT INLET

(75) Inventors: Peter Mori, Walperswil (CH); Fabien Ludovic Agon, Blonay (CH)

(73) Assignee: Societe des Produits Nestle S.A., Vevey (CH)

(*) Notice: Subject to any disclaimer, the term of this patent is extended or adjusted under 35 U.S.C. 154(b) by 394 days.

(21) Appl. No.: 14/006,902

(22) PCT Filed: Mar. 22, 2012

(86) PCT No.: PCT/EP2012/055047
§ 371 (c)(1),
(2), (4) Date: Sep. 23, 2013

(87) PCT Pub. No.: WO2012/126971
PCT Pub. Date: Sep. 27, 2012

(65) Prior Publication Data
US 2014/0007776 A1 Jan. 9, 2014

(30) Foreign Application Priority Data
Mar. 23, 2011 (EP) .................................... 11159301

(51) Int. Cl.
*A47J 31/40* (2006.01)
*A47J 31/36* (2006.01)

(52) U.S. Cl.
CPC ........... *A47J 31/407* (2013.01); *A47J 31/369* (2013.01); *A47J 31/3633* (2013.01)

(58) Field of Classification Search
CPC .... A47J 31/3633; A47J 31/407; A47J 31/369; A47J 31/36
(Continued)

(56) References Cited

U.S. PATENT DOCUMENTS 5,265,518 A * 11/1993 Reese ...................... A47J 31/32
99/280
6,009,792 A * 1/2000 Kraan ................. A47J 31/0668
99/295
(Continued)

FOREIGN PATENT DOCUMENTS

CN 2636776 Y 9/2004
CN 101606825 A 12/2009
(Continued)

OTHER PUBLICATIONS

China Office Action for Application No. 201280016854.8 dated Dec. 8, 2015, 19 pages.

*Primary Examiner* — Ibrahime A Abraham
*Assistant Examiner* — Justine C Dodson
(74) *Attorney, Agent, or Firm* — K&L Gates LLP

(57) ABSTRACT

A machine (1) for preparing a beverage from at least one ingredient (2) comprises: an ingredient processing module (3); an ingredient passage (4) having an ingredient mouth (41) for inserting along an insertion direction (42) an ingredient from outside such machine (1) into the ingredient processing module; and a cover (5) pivotable between a position covering the ingredient passage and a position uncovering the ingredient passage, The cover (5) is pivotable about a pivoting axis (51) that is generally parallel to the insertion direction (42) and/or that is generally perpendicular to the mouth (41) of the passage (4).

17 Claims, 4 Drawing Sheets

(58) Field of Classification Search
USPC ............. 99/289 R, 279, 300, 304–307, 310, 99/312–314, 316–319
See application file for complete search history.

(56) References Cited

U.S. PATENT DOCUMENTS

| | | | | |
|---|---|---|---|---|
| 6,009,793 | A * | 1/2000 | Blankenship | A47J 31/0573 99/305 |
| 6,272,974 | B1 * | 8/2001 | Pascotti | A47J 31/0615 99/279 |
| 6,459,854 | B1 | 10/2002 | Yoakim et al. | |
| 7,721,911 | B2 * | 5/2010 | Chou | B65D 43/0202 215/310 |
| 2003/0200871 | A1 * | 10/2003 | Mangiapane | A47J 31/446 99/291 |
| 2005/0126399 | A1 | 6/2005 | Bragg et al. | |
| 2006/0021515 | A1 * | 2/2006 | Graviss | A47J 31/52 99/279 |
| 2006/0027103 | A1 | 2/2006 | Boussemart et al. | |
| 2006/0230941 | A1 | 10/2006 | Ryser et al. | |
| 2009/0095165 | A1 * | 4/2009 | Nosler | A47J 31/007 99/289 R |
| 2009/0308258 | A1 | 12/2009 | Boussemart et al. | |
| 2010/0218684 | A1 | 9/2010 | Etter et al. | |
| 2010/0239734 | A1 * | 9/2010 | Yoakim | A47J 31/22 426/433 |
| 2010/0263547 | A1 | 10/2010 | Cahen et al. | |
| 2010/0282090 | A1 | 11/2010 | Etter et al. | |
| 2010/0288132 | A1 * | 11/2010 | Gavillet | A47J 31/3628 99/295 |
| 2011/0041696 | A1 | 2/2011 | Aemisegger et al. | |
| 2011/0041701 | A1 | 2/2011 | Chatterjee et al. | |
| 2011/0127255 | A1 | 6/2011 | Boussemart et al. | |
| 2011/0259202 | A1 | 10/2011 | Cahen et al. | |
| 2013/0032034 | A1 | 2/2013 | Jarisch et al. | |
| 2013/0247775 | A1 | 9/2013 | Mori | |

FOREIGN PATENT DOCUMENTS

| | | | |
|---|---|---|---|
| CN | 201630845 | 11/2010 | |
| EP | 0512468 A1 | 11/1992 | |
| EP | 0512470 A1 | 11/1992 | |
| EP | 1859714 A1 | 11/2007 | |
| WO | 2007135136 A1 | 11/2007 | |
| WO | 2008006682 | 1/2008 | |
| WO | 2009090201 A1 | 7/2009 | |
| WO | WO 2009115474 A1 * | 9/2009 | ........... A41J 31/0668 |

* cited by examiner

BEVERAGE MACHINE WITH A COVER FOR AN INGREDIENT INLET

CROSS REFERENCE TO RELATED APPLICATIONS

The present application is a National Stage of International Application No. PCT/EP2012/055047, filed on Mar. 22, 2012, which claims priority to European Patent Application No. 11159301.8, filed Mar. 23, 2011, the entire contents of which are being incorporated herein by reference.

FIELD OF THE INVENTION

The field of the invention pertains to beverage preparation machines, in particular using capsules of an ingredient of the beverage to be prepared, such as beverage preparation machines having a passage for inserting a beverage ingredient into the machine, in particular an ingredient supplied in the form of a preportioned ingredient capsule, and a member for covering and uncovering the passage, as desirable during normal use of the machine.

For the purpose of the present description, a "beverage" is meant to include any human-consumable liquid substance, such as tea, coffee, hot or cold chocolate, milk, soup, baby food, etc. . . . A "capsule" is meant to include any preportioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved and/or ingredients that are stored and dosed automatically in the machine or else are added at the time of preparation of the drink. Some beverage machines possess filling means that include a pump for liquid, usually water, which pumps the liquid from a source of water that is cold or indeed heated through heating means, e.g. a thermoblock or the like.

An example of a machine for preparing a beverage from a flavouring concentrate that is contained in a reservoir and that is mixed with a liquid from another reservoir is disclosed in US 2003/0200871.

Especially in the field of coffee preparation, machines have been widely developed in which a capsule containing beverage ingredients is inserted in a brewing device. The brewing device is tightly closed about the capsule, water is injected at the first face of the capsule, the beverage is produced in the closed volume of the capsule and a brewed beverage can be drained from a second face of the capsule and collected into a receptacle such as a cup or glass.

Brewing devices have been developed to facilitate insertion of a "fresh" capsule and removal of the capsule upon use. Typically, the brewing devices comprise two parts relatively movable from a configuration for inserting/removing a capsule to a configuration for brewing the ingredient in the capsule.

The actuation of the movable part of the brewing device may be motorized. Such a system is for example disclosed in EP 1 767 129 (also published as US 2013/032034). In this case, the user does not have to provide any manual effort to open or close the brewing device. The brewing device has a capsule insertion passage provided with a safety door assembled to the movable part of the brewing device via a switch for detecting an undesired presence of a finger in the passage during closure and prevent injuries by squeezing.

The actuation of the movable part of the brewing device may be manual. WO 2009/043630 (also published as US 2010/0288132) discloses a beverage preparation machine including a brewing unit having a front part with a passage having a mouth for inserting a capsule into the brewing unit. The front part is arranged to telescope out of the machine's housing for uncovering the passage for inserting a capsule into the brewing unit and telescopes into the brewing unit for sliding the passage under the housing and thus covering the passage by the housing. A pivotable arched handle is configured for driving the front part manually. In another embodiment, the telescoping front part is helicoidally movable about an axis perpendicular to the capsule insertion passage and parallel to the passage's mouth, the mouth of the passage being delimited by the telescoping front part and sliding with the front part under the machine's outermost housing by which it is covered in the closed position and uncovered in the open position.

WO 2005/004683 (also published as US 2006/0230941) and WO 2007/135136 (also published as US 2009/0308258) disclose a device comprising a frame, a fixed holding part for the capsule, a movable holding part which is mounted relative to the frame in a sliding relationship, one or two knuckle joint mechanisms that provide a mechanical system which enables to close in a steady and fluid-tight manner the holding parts about the capsule while also resisting to the counter-force acting while re-opening and generated by the internal brewing pressure, and a handle for directly levering the knuckle joint mechanism. Such a device forms a simple assembly enabling insertion of the capsule by vertical fall through a passage in the frame and removal of the used capsule in the same direction as the insertion direction. The handle is in the form of a lever that is manually pivotable about an end thereof adjacent the machine's housing. In the closed position, the handle may be pivoted down against the machine's housing and over the capsule inlet passage to cover it. In the open position, the handle is pivoted up away from the capsule inlet passage to uncover this passage. Hence, in addition to moving the holding part, the handle serves to cover and uncover the passage for the capsule. The manual force required to move the movable parts varies during closure and opening of the machine and depends on the dimensional tolerances of the capsules used, the positioning of the capsule and the temperature of the brewing unit.

SUMMARY OF THE INVENTION

The invention relates to a machine for preparing a beverage from at least one ingredient and dispensing such prepared beverage. For instance, the machine is a coffee, tea, chocolate, cacao, milk or soup preparation machine. In particular, the machine is arranged for preparing within a beverage processing module a beverage by passing hot or cold water or another liquid through a capsule containing an ingredient, such as a flavouring ingredient, of the beverage to be prepared, such as ground coffee or tea or chocolate or cacao or milk powder.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml, e.g. the volume for filling a cup or mug, depending on the type of beverage. Formed and dispensed beverages may be selected from ristrettos, espressos, lungos, cappuccinos, café latte, americano coffees, teas, etc. . . . For example, a coffee machine may be configured for dispensing espressos, e.g. an adjustable volume of 20 to 60 ml per serving, and/or for dispensing lungos, e.g. a volume in the range of 70 to 150 ml per serving.

In particular, the machine comprises: an ingredient processing module; an ingredient passage having an ingredient mouth for inserting along an insertion direction an ingredient from outside such machine into the ingredient processing module; and a cover pivotable between a position covering the ingredient passage and a position uncovering the ingredient passage.

The ingredient passage can be generally upright so that the ingredient, optionally contained within a capsule, is movable in the passage under the effect of gravity. The passage may comprise an insertion portion guiding the ingredient into the processing module and an evacuation portion guiding the ingredient from the processing module. The cover is normally associated with the insertion portion.

Typically, the beverage preparation machine comprises a stationary structure, such as a housing and/or a frame. The structure may be arranged to rest on a support surface such as a table. The ingredient passage may be stationary relative to the structure. The cover of the invention may be movable relative to the structure between the covering and uncovering positions.

Typically, the passage may extend from an outer face of the structure, e.g. outer housing, to the ingredient processing module and the cover can be pivotable in a plane that is parallel to this outer face adjacent to the cover, in particular outside the outer face. The face may have an arrangement for guiding the cover between the covering and the uncovering positions. The guiding arrangement can include a guiding recess and/or a guiding rail extending from the passage or from adjacent thereto. The face may form or delimit a top machine face and/or a generally horizontally extending machine face.

Hence, the passage extends from the outside of the machine and to the ingredient processing module. In other words, the ingredient processing module is at a distance from the outside of the machine, in particular from a machine's outer housing surface.

The passage has a mouth for the insertion of ingredient which then passes from the mouth along the passage along an insertion direction into the ingredient processing module. The mouth is formed by an end portion of the passage. Hence the passage is generally parallel to the insertion direction. The mouth of the passage, i.e. the opening through which the ingredient is inserted into the passage, has a notional or virtual mouth area or mouth plane (delimited by the boundaries of an end of the passage) through which the ingredient is inserted from the outside into the passage. This notional mouth area or plane is usually generally perpendicular to the passage, i.e. perpendicular to the insertion direction, or it may be at a non-perpendicular angle thereto, usually of more than 45 deg, e.g. from 60 or 75 to less than 90 deg.

The ingredient processing module can have a configuration of processing the ingredient and a configuration of transfer of the ingredient, e.g. insertion of the ingredient into the processing module and/or removal of the ingredient from the processing module, in particular into a waste ingredient collector.

The machine can comprise a motor for driving the processing module: from a configuration for processing the ingredient; to an ingredient transfer configuration for inserting such ingredient into the processing module and/or removing said ingredient therefrom; and/or vice versa. The motor may be arranged to drive the processing module into: the processing configuration when the cover is moved into the covering position; and/or the transfer configuration when the cover is moved into the uncovering position.

In accordance with the invention, the cover is pivotable about a pivoting axis that is generally parallel to the insertion direction and/or that is generally perpendicular to the mouth of the ingredient passage.

When the mouth is generally perpendicular to the insertion direction, the cover's pivoting axis is generally perpendicular to the mouth and generally parallel to the insertion direction. When the mouth is non-perpendicular to the insertion direction, the pivoting axis is typically perpendicular to the mouth or it may be parallel to the insertion direction.

As opposed to prior art covering handles, e.g. as disclosed in WO 2007/135136, which are pivotable between a position extending along the machine housing to cover the ingredient passage and a position angled away therefrom to uncover the ingredient passage, the machine of the present invention does not need a significant volume of free space adjacent the machine's housing for the pivoting of the cover.

In a particular embodiment, the ingredient mouth and the ingredient passage are configured to receive and guide an ingredient capsule. For instance, the passage and optionally the mouth have a slide for guiding a guiding flange of the capsule to the ingredient processing module. The ingredient processing module can be configured to hold such an ingredient capsule.

The capsule may have a guiding flange, e.g. a rim, and a body that is, symmetric or asymmetric, conical or frusto-conical or cylindrical or spherical or hemispherical or frusto-spherical, containing the ingredient, e.g. ground coffee, tea or cacao or another beverage ingredient. The guiding flange may be deformed during the guiding process, e.g. urged beyond reference members or stop members.

Suitable examples of capsules and capsule handling mechanisms inside a beverage machine are disclosed in EP 859 714, EP 2 103 236, EP 2 205 133, and in the references cited therein.

The pivotable cover may have a planar portion that covers and uncovers the ingredient passage. The planar cover portion is in particular arranged to pivot in its own plane.

The cover may be a generally plate-like member, planar or arched movable to close and open the ingredient passage. The cover may closely follow the outer shape and boundaries of the machine between the covering and uncovering positions without noticeable increase of the overall space occupation of the machine between the covering and uncovering positions of the cover.

In an embodiment, the cover has a cover opening, such as a window, that is pivotable, typically with the cover:
  over the passage to permit insertion of the ingredient through the cover opening into the ingredient processing module via the passage; and
  away from the passage to prevent insertion of the ingredient through the cover opening into the processing module.

For example, the cover opening is shaped after a profile of an ingredient capsule in position for insertion. The shape of the cover opening may be configured to bring the capsule in the right orientation for the insertion and processing of the ingredient capsule, e.g. to discriminate the appropriate orientation of an asymmetric capsule at insertion.

The cover may be configured to: receive an ingredient, in particular an ingredient capsule, when the cover is in the covering position; drive the ingredient when the cover is moved from the covering to the uncovering position; and release such ingredient into the ingredient passage in the uncovering position. In particular, the cover may delimit a capsule seat shaped after a portion of an ingredient capsule to receive the capsule when the cover is in the covering position and drive the capsule into the ingredient passage.

Hence, while the processing module is processing an ingredient for preparing a beverage, it is already possible to properly pre-position an ingredient for a subsequent beverage preparation on the cover in the covering position. The proper prepositioning of the ingredient may reduce the time needed to empty and refill the processing module between two beverage preparations. Of course, it is also possible to mount an ingredient feeder such as a reservoir, e.g. a cartridge of capsules, on the cover so that a series of successive beverage servings can be prepared, e.g. automatically or semi-automatically, without having to manually position individual capsules for their insertion into the processing module.

The cover may have a circular or part circular outer periphery. The machine can have an outer housing with a circular or part circular opening or cavity in which the outer periphery of the cover is rotatable. The cover may also be located above an outer machine housing or machine frame or may be covered by such a housing or frame.

The ingredient processing module typically has a first part and a second part movable relative to the first part from a position for housing therein an ingredient, in particular an ingredient capsule, to a transfer position for inserting an ingredient into the processing module and/or for evacuation thereof from the processing module. Examples of such processing modules are disclosed in EP 1 859 714, EP 2 103 236, EP 2 205 133, and in the references cited therein. The first and second movable parts may be relatively movable manually, semi-automatically and/or automatically, in particular by an electric motor.

The second part of the processing module can be made movable relative to the first part and relative to the stationary structure. The first part may be stationary relative to the structure or movable thereto.

The second part can be arranged to move in a direction, in particular an arched and/or linear direction. Typically, the first and second parts in their processing position delimit a cavity for housing the beverage ingredient, such as tea or coffee or chocolate or powder milk. The ingredient processing module may include an upstream fluid circuit for delivering a carrier liquid, such as water, into the cavity and a downstream fluid circuit having a beverage outlet for delivering from the cavity the beverage formed by the carrier liquid flavoured by the beverage (flavouring) ingredient, the ingredient being in particular inserted into the cavity within a capsule.

As discussed above, the ingredient is optionally inserted into the processing module and/or evacuated therefrom within an ingredient capsule, e.g. an aluminium or plastic or paper enclosure containing the ingredient.

At least one of the first and second parts may be connected to the pivotable cover so that relative movement of the first and second parts causes movement of the pivotable cover, and/or vice-versa. The first and second parts can be connected to the pivotable cover by at least one of:
- a data processing link, such as an electric control unit in particular a unit controlling at least one automatic actuator actuating at least one of the first and second parts and the pivotable cover, the actuator being optionally selected from electric, hydraulic and/or pneumatic actuators, such as one or more electric motors;
- a mechanical movement transmission, in particular comprising at least one of: gears, e.g. wheels and racks, such as spur and/or friction gears; cam followers and cams; cranks and crank shafts; and
- a magnetic movement transmission, in particular comprising an electromagnet and/or a permanent magnet.

Relative movement of the first and second parts into the capsule housing position may cause movement of the pivotable cover into its covering position, and/or vice versa. Relative movement of the first and second parts into the transfer position can cause movement of the pivotable cover into its uncovering position, and/or vice versa.

For instance, the parts are moved into one position manually or by a powered actuator and then moved into another position by a return spring that is stressed by the movement in the first position. Likewise, the cover may be pivotable manually, semi-automatically and/or automatically.

The cover may be associated with an automatic return device for driving the cover into a stable position, in particular into the covering position and/or into the uncovering position. The automatic return device may be a bistable device for driving the cover into two different positions, in particular into the covering position and into the uncovering position.

Manual or semi-manual/automatic actuation of the cover may be direct or indirect, i.e. a user may directly actuate the cover, e.g. pushing or pulling the cover, or actuate a distant part that is connected to the cover, e.g. via a mechanical transfer mechanism such as a gear, belt or cam system. The cover may have a shape that allows a user, e.g. via the hand or one or more fingers, to manually seize it or push it for moving it between the covering and the uncovering position during normal use. For example the cover has a portion with a surface structure or composition, in particular an anti-skid surface that provides friction against a human hand to reduce the necessary gripping force needed to achieve a reliable user-control of the cover.

The cover may form a user-interface, in particular a user-interface for controlling the ingredient processing module.

The machine typically includes a control unit, in particular a unit for controlling the ingredient processing module. The cover may form or be part of a user-interface in data communication with the control unit, optionally the cover comprising or being associated with a sensor connected to the control unit for sensing a position of the cover such as a sensor selected from an electro-mechanical switch sensor, a magnetic sensor, an electromagnetic sensor and an optical sensor. The control unit may comprise a power management module arranged to power the control unit and optionally further electric components, such as a user-interface and/or a thermal conditioner in particular a heater, when the control unit is unpowered or in standby state and the cover moved, in particular into the uncovering position.

For instance, the ingredient processing module is arranged to:

process the ingredient when the cover is pivoted into the covering position, in particular if an ingredient is sensed in the module by an appropriate ingredient or ingredient capsule sensing arrangement;

execute a service cycle, e.g. cleaning and/or rinsing the ingredient processing module, when the cover is pivoted into the covering position, in particular when no ingredient is sensed in the module by an appropriate sensing arrangement;

receive and/or evacuate the ingredient when the cover is pivoted into the uncovering position; and/or interrupt processing of the ingredient when the cover is pivoted into an intermediate position between the covering and uncovering position.

The machine may have a control unit for controlling the ingredient processing module, the control unit being arranged to initiate automatically beverage preparation when the ingredient is inserted into the processing module and the cover is moved into the covering position. Insertion of the ingredient into the module may be detected by any system, e.g. as known in the art such as an optical detection. The cover may also be used as a main switch to power the machine.

The machine may comprise a lock for locking the cover in the covering position when an ingredient is being processed in the processing module or when a service cycle is being carried out. The lock may be a hard lock, e.g. a mechanical lock interfering with the motion of the cover, and/or a soft lock, e.g. a program controlling an actuator connected to the cover to bring and/or maintain the cover in a desired position.

The cover may be configured to interrupt ingredient processing in the module when the cover is actuated away from the covering position, e.g. manually or (semi-) automatically.

The cover can be arranged to confine fluid within the ingredient passage. Typically, the cover may form a safety barrier to prevent liquid or vapour projections outside the ingredient passage during or at the end of ingredient processing in the processing module. For example, the cover is configured:

to extend beyond a periphery of the mouth in the covering position; and/or to be movable out of the covering position only after a pressure release in the ingredient passage.

The cover may include one or more small through-openings for allowing the release of vapour and avoid accumulation of moisture under the cover during or at the end of ingredient processing in the processing module. Additionally or alternatively, a periphery of the cover may delimit part of openings through which such vapour may be released during or at the end of ingredient processing in the processing module.

The ingredient processing module can be configured to circulate automatically a mixing and/or infusion liquid to the ingredient when the first and second parts reach the processing position, e.g. the position for housing the ingredient in the processing module.

The machine may have a control unit that is arranged to initiate automatically a shut-down or standby process and/or a service process, when no ingredient is inserted in the processing module and the cover is moved into the covering position. Likewise, the absence of insertion of the ingredient into the module may be detected by any suitable system, e.g. as mentioned above.

Hence, a beverage machine with a simple and space-saving cover for an ingredient insertion passage can be provided to:

open and close access to the capsule insertion passage;

act as a user-interface to control the operation of the machine; and/or prevent undersirable user operations, e.g. open the ingredient processing module in the course of processing.

The cover can be in the covering position when the machine is turned off or when an ingredient processing, e.g. brewing, is being carried out.

For example, depending on the machine status the movement of the cover by a user can have different effects:

When the machine is turned off, the user bringing the cover towards the uncovering position can start-up the machine and allow insertion of the ingredient.

When the machine is processing the ingredient, the user moving the cover from the covering position will interrupt the ingredient processing and then drive the processing module into the transfer configuration, optionally, the cover may be locked in an intermediate position between processing interruption and reaching the transfer configuration so that a new ingredient can be inserted into the passage only once the processing module is ready to receive such an ingredient.

The cover can be in the uncovering position when the machine is already turned on, after the user has uncovered the ingredient passage: upon the end of processing an ingredient and dispensing a beverage; or simply after having turned on the machine.

In the open position the user may introduce a new ingredient in the processing module. Thereafter, when the user brings the cover into the covering position, the processing module may be automatically driven into the processing configuration. Ingredient processing may start as soon as the processing module has reached the processing configuration. If needed, the ingredient processing may be delayed until a start-up process is completed, e.g. at the end of a shut-on process or standby exit process.

When the user brings the cover into the covering position without having inserted an ingredient into the passage, a service program may be initiated or a shutdown or standby process may be initiated.

BRIEF DESCRIPTION OF THE DRAWINGS

The invention will now be described with reference to the schematic drawings, wherein.

DETAILED DESCRIPTION

FIGS. 1 to 4 illustrate parts of an exemplary embodiment of a machine 1 in accordance with the invention.

Figure 1:
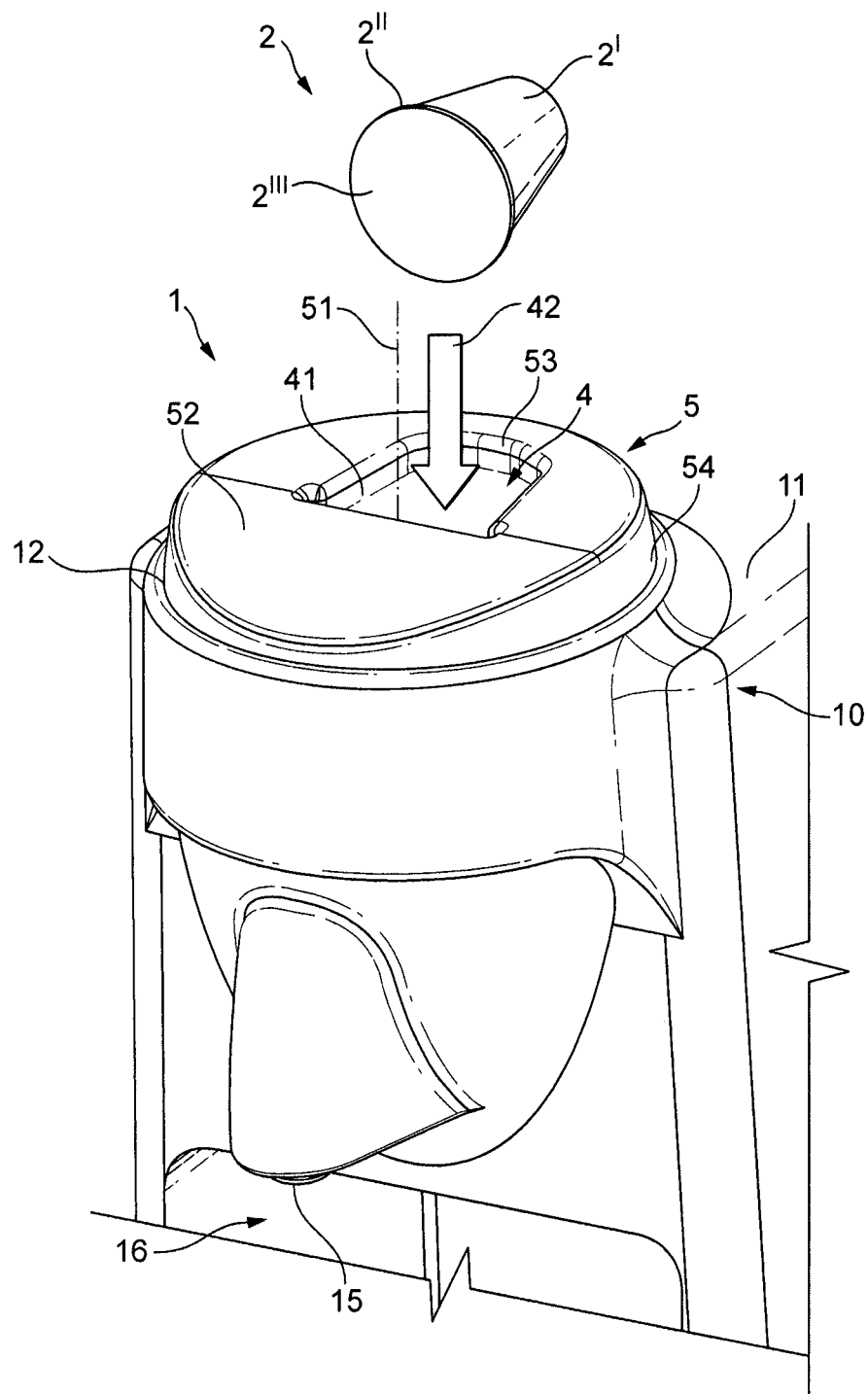
FIG. 1 shows a perspective front and top view of part of a machine according to invention.
Figure 2:
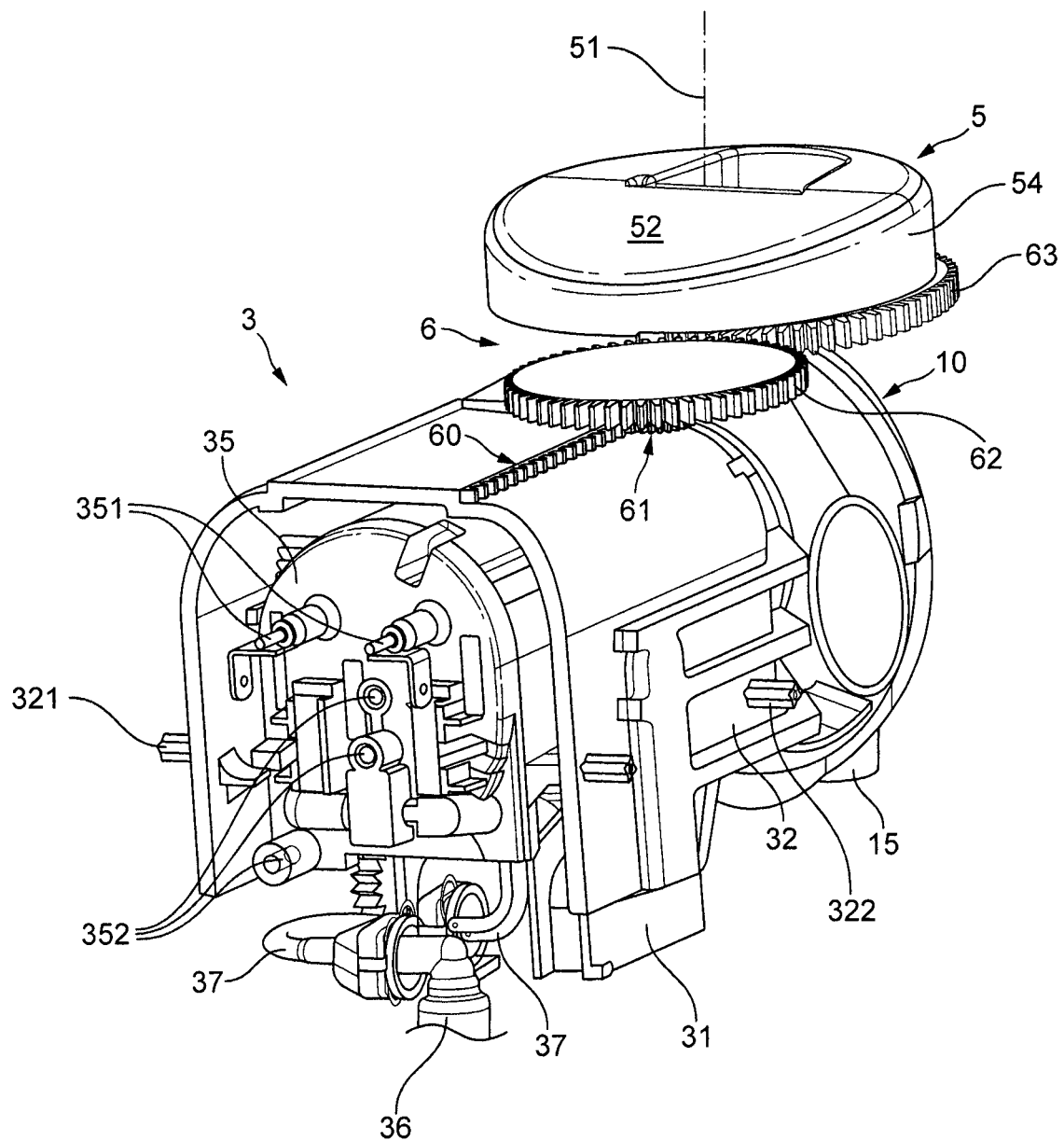
FIG. 2 illustrates a perspective rear and top view of an ingredient processing module and a pivotable cover of the machine shown in FIG. 1.
Figure 3:
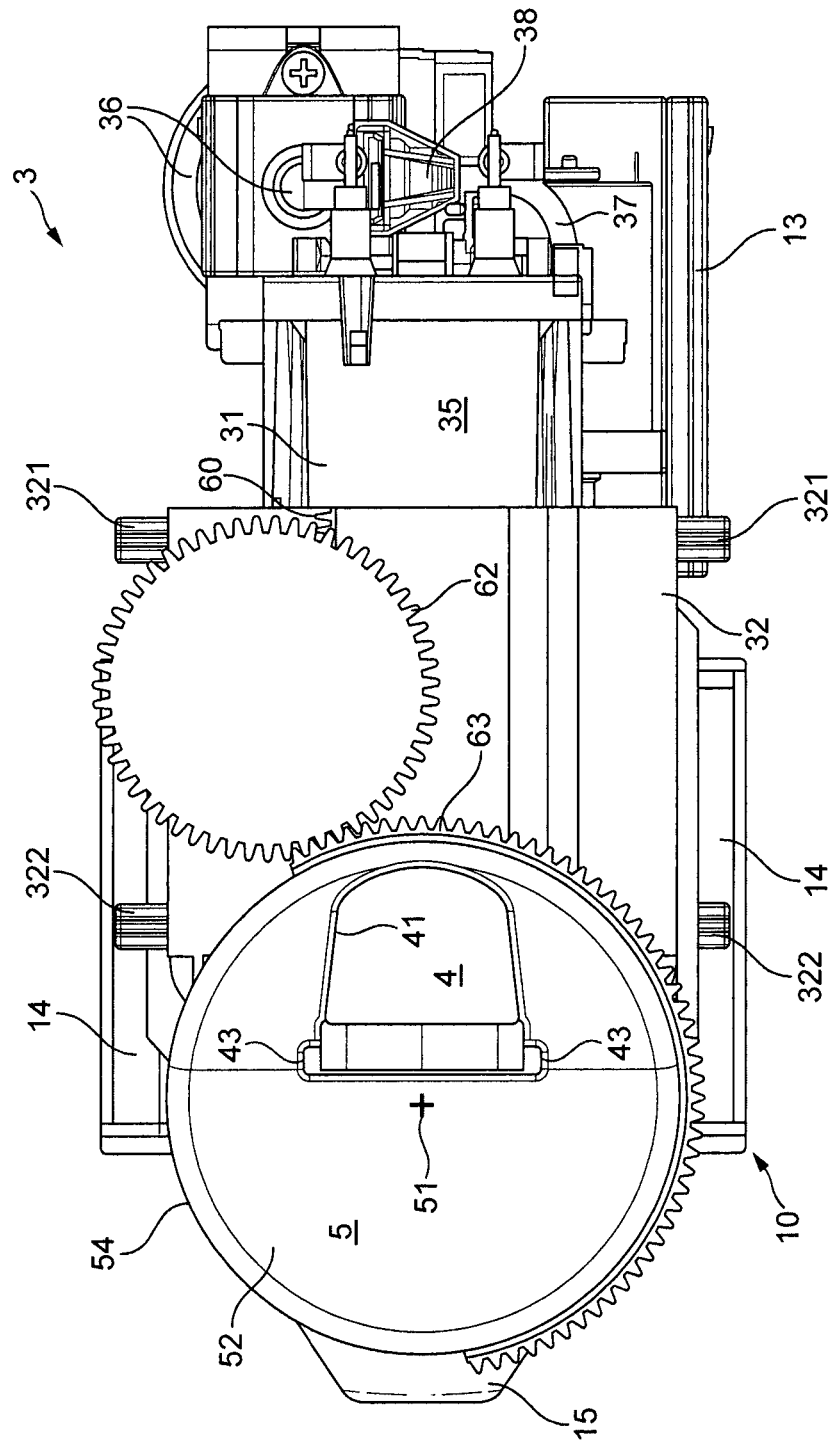
FIGS. 3 and 4 are top views of two configurations of the ingredient processing module and cover shown in FIG. 2.
Figure 4:
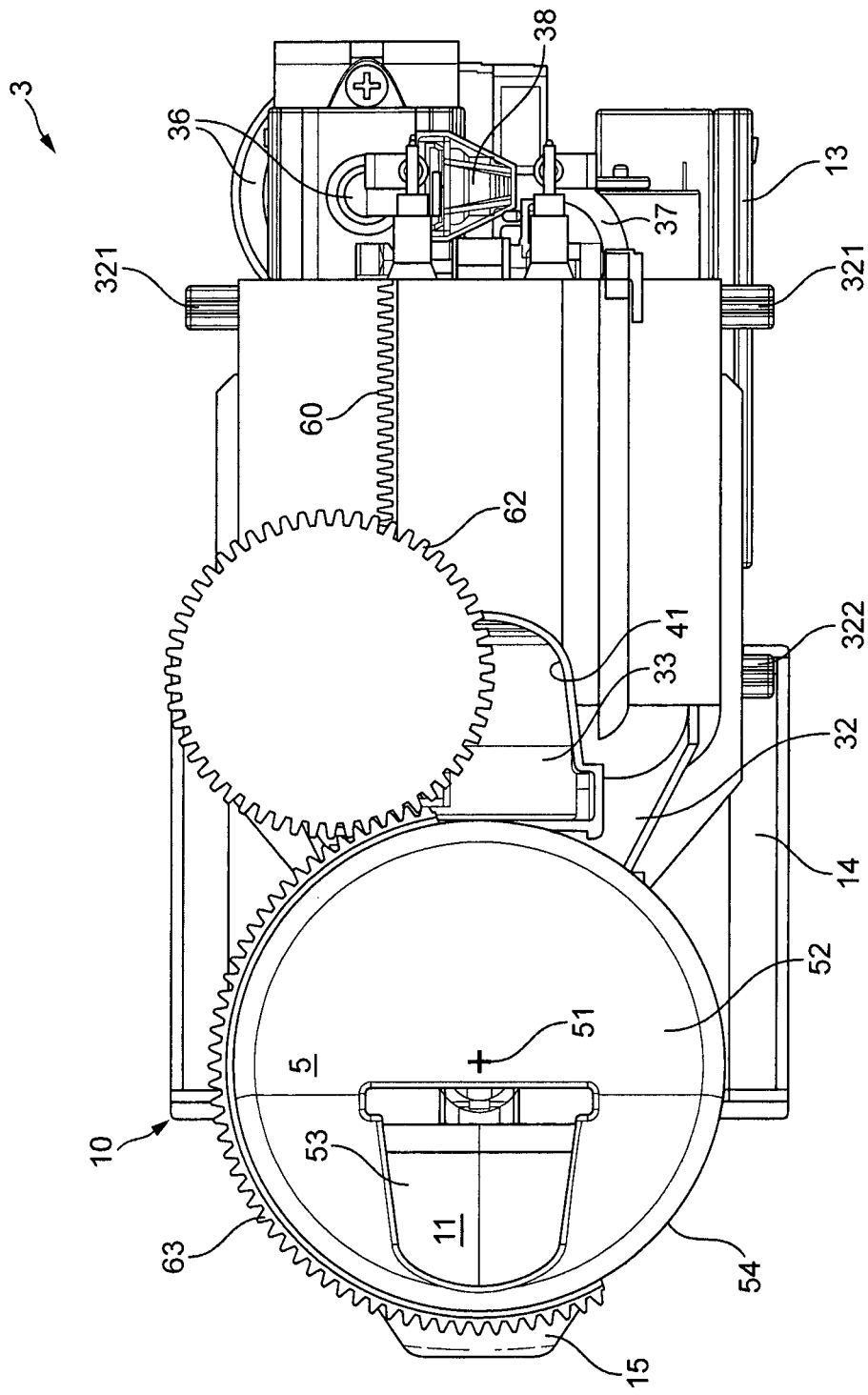

Machine 1 includes: an ingredient processing module 3, as illustrated in FIGS. 2 to 4; an ingredient passage 4 having an ingredient mouth 41 for inserting along an insertion direction 42 ingredient 2 from outside such machine 1 into ingredient processing module 3, as illustrated in FIGS. 1 and 3; and a cover 5 pivotable between a position covering the ingredient passage (FIGS. 2 and 4) and a position uncovering the ingredient passage (FIGS. 1 and 3).

The ingredient may be supplied into the processing module in the form of an ingredient capsule 2, e.g. of the type described above under the header "field of the invention". Capsule 2 may have a container-body 2', e.g. a generally cup-shaped body, having a rim or a flange 2" to which a cover lid 2''' is attached, in particular sealed, as illustrated in FIG. 1. Suitable capsules are for example disclosed in EP 0 512 468 and EP 0 512 470.

Machine 1 typically has an outlet 15 for dispensing beverage from ingredient processing module 3 to a beverage dispensing area located underneath outlet 15. Typically, this dispensing area is configured to support a user cup or a user mug underneath outlet 15.

Module 3 can have an ingredient cavity for receiving and housing therein an ingredient 2 supplied into machine 1 via passage 4. Module 3 may be configured to circulate a liquid into the cavity, typically for mixing with the ingredient in particular for brewing the ingredient. An outer wall 33 of such an ingredient cavity is shown in FIG. 4. The outer wall may be formed by an ingredient or capsule cage as known in the art.

The cavity may be configured for holding and housing a flavouring ingredient, such as tea or coffee or chocolate or powder milk. As mentioned above, the ingredient may be inserted pre-portioned within a capsule 2 into this cavity.

A flavoured beverage may be prepared by circulating a carrier liquid, such as water, into the ingredient cavity to flavour the liquid by exposure to the flavouring ingredient held in the cavity.

The ingredient cavity may be delimited by first and second parts that are relatively movable between a processing configuration for housing therein the ingredient and a transfer configuration for inserting such ingredient into the processing module and/or for evacuation thereof from the processing module. An automatic ingredient recognition system may be used to parameterize and adjust the processing of the ingredient automatically in line with the type of ingredient.

When closed capsules 2 of flavouring ingredients are used, first and second parts delimiting the ingredient cavity may include a capsule opener such as blades and/or a tearing tool, e.g. a plate with a tearing profile, for instance as known from Nespressom machines. See for example EP 0 512 468 and EP 0 512 470.

Beverage machine 1 typically includes one or more of the following components:

a) Processing module 3, e.g. a fluid circuit including a brewing unit, delimiting in the processing position an inner flavouring chamber for receiving and housing an ingredient of the beverage such as a flavouring ingredient, in particular a pre-portioned ingredient supplied within capsule 2, and for guiding via an inlet an incoming flow of liquid for flavouring thereof, such as water, through this ingredient to beverage outlet 15;

b) an in-line heater 35 for heating this flow of liquid to be supplied to ingredient 2;

c) a pump 36 for pumping liquid through the in-line heater 35;

d) one or more fluid connecting members for guiding liquid from a source of liquid, such as tank of liquid; a fluid tube 37 extending to heater 35 from pump 36 being shown in FIGS. 2 to 4, tube 37 being connected to pump 36 via an appropriate connector 38;

e) an electric control unit, in particular comprising a printed circuit board (PCB), for receiving instructions from a user via an input user-interface and for controlling in-line heater 35 and pump 36; and/or f) one or more sensors for sensing at least one characteristic selected from characteristics of processing module 3, in-line heater 35, pump 36, a liquid tank, an ingredient collector, a flow of the liquid (e.g. by a flowmeter), a pressure of the liquid and a temperature of the liquid, and for communicating such characteristic(s) to the control unit.

In particular, ingredient processing module 3 includes or is connected to an upstream fluid arrangement, e.g. incorporating a liquid driver, such as a pump 36, and a thermal conditioner, such as a heater 35, for circulating thermally conditioned liquid, such as water, from a source, e.g. a liquid reservoir, into the ingredient processing cavity delimited by walls 33. Examples of upstream fluid arrangements are disclosed in WO 2009/074550 (also published as US 2010/0263547) and in WO 2009/130099 (also published as US 2011/0041696). The heater may be a thermoblock or an on demand heater (ODH), for instance an ODH type disclosed in EP 1 253 844 (also published as U.S. Pat. No. 6,459,854), EP 1 380 243 (also published as US 2006/027103) and EP 1 809 151 (also published as US 2011/127255). Heater 35 may include a heating resistor having a pair of connectors 351 that may be connected to an electric power source, e.g. controlled by a triac. Heater 35 may include one or more seats 352 for receiving one or more sensors, e.g. temperature sensors and/or flow sensors.

Examples of suitable brewing units and capsule management are for example disclosed in WO 2005/004683 (also published as US 2006/0230941), WO2007/135136 (also published as US 2009/0308258) and WO 2009/043630 also published as US 2010/0288132), which are hereby incorporated by way of reference. Suitable fluid circuits of beverage preparation modules are for instance disclosed in WO 2009/074550 (also published as US 2010/0263547) and WO 2009/130099 (also published as US 2011/0041696), which are hereby incorporated by way of reference. Control unit configurations and connections are for example disclosed in WO 2009/043851 also published as US 2010/0282090) and WO 2009/043865 (also published as US 2010/0218684).

Moreover, ingredient processing module 3 typically includes a downstream fluid arrangement leading into outlet 15 for dispensing beverage to a user, e.g. to an area for placing a user-cup or a user-mug, the beverage formed in the ingredient cavity containing the ingredient mixed with the circulating liquid. The dispensing area may be delimited at the bottom by a support surface for holding a user cup or mug. Such support surfaces are well known in the art, e.g. as disclosed in EP 1 867 260 (also published as US 2011/259202) and WO 2009/074557 (also published as US 2010/0263547).

As illustrated in FIGS. 1 to 4, cover 5 is pivotable about a pivoting axis 51 that is generally parallel to insertion direction 42 and/or that is generally perpendicular to mouth 41 of ingredient passage 4.

Ingredient mouth 41 and ingredient passage 4 can be configured to receive and guide an ingredient capsule 2. Passage 4 and mouth 41 having a slide 43 for guiding flange 2" of capsule 2 to ingredient processing module 3. Ingredient processing module 3 is configured to hold ingredient capsule 2. The handling system of capsule 2 in passage 4 and ingredient processing module 3 may be of the type known in the art, e.g. as taught in EP 1 859 713, EP 2 103 236 and EP 2 205 133.

Cover 5 may have a planar portion 52 that covers and uncovers the ingredient passage 4. Planar cover portion 52 can be arranged to pivot generally in its own plane. For example, portion 52 is coplanar with the plane of rotation, typically generally perpendicular to axis of rotation 51, or portion 52 is at a small angle to the plane of rotation e.g. up to 15 or 30 deg thereto.

Cover 5 may have a cover opening, such as a window, that is pivotable. Opening may be pivotable over passage 4 and mouth 41 to permit insertion of ingredient 2 through opening into ingredient processing module 3 via passage 4, as illustrated in FIG. 1. Opening can be pivotable away from the passage 4 and mouth 41 to prevent insertion of ingredient 2 through opening into processing module 3, as illustrated in FIG. 4.

Cover opening can be shaped after a profile of an ingredient capsule 2 in position for insertion along insertion direction 42, as illustrated in FIG. 1.

Alternatively, the cover's opening for permitting the insertion of the ingredient, e.g. the ingredient capsule, may not follow, entirely or at all, the profile of an ingredient capsule, and/or may not be shaped as a window. For instance, the cover opening may extend to a peripheral edge of the cover. The cover can be shaped generally as a pivotable disc sector typically having an angle between 15 and 270 deg such as 30 to 180 deg, the opening being delimited by the radial edges of the disc sector. The cover can be generally shaped as a leaf, ellipse, rectangle or any other shape extending over the ingredient mouth and pivotable approximately about a peripheral edge of the cover away from the mouth. Many alternatives and variations are of course possible.

Cover 5 can be configured to: receive an ingredient, in particular an ingredient capsule 2, when cover 5 is in the covering position (FIGS. 2 and 4); drive such ingredient 2 when cover 5 is moved from the covering to the uncovering position; and release ingredient 2 into ingredient passage 4 in the uncovering position (FIGS. 1 and 3). For example, cover 5 delimits a capsule seat 53 generally shaped after a cross-sectional shape of an ingredient capsule 2 to receive capsule 2 when cover 5 is in the covering position and drive such capsule 2 into ingredient passage 4.

Capsule seat 53 may be formed by cover 5 and by a frame or housing portion 11 of machine 1. In particular, the edge of opening may be used to drive ingredient 2 by pivoting cover 5 from the covering to the uncovering position. Frame or housing portion 11 may be used to support ingredient 2 between the covering and the uncovering position. Frame or housing portion 11 may lead into passage 4 so that ingredient 2 driven over the frame or housing portion 11 is allowed to enter passage 4, e.g. typically under the effect of gravity, when cover 5 reaches the uncovering position.

Machine 1 typically has an outer housing 10. Passage 4 may generally extend from a face of housing 10 to the ingredient processing module 3. In particular, cover is pivotable within a plane parallel to housing face, in particular outside outer housing. Housing face may be a top face of machine 1 or a side face, e.g. a front face.

Cover 5 may have a circular or part circular outer periphery 54. Machine 1 can have an outer housing 10 with a circular or part circular opening or cavity 12 in which the outer periphery of the cover is rotatable. Cover 5 may protrude through the outer housing 10.

Alternatively, the cover may be located under the outer machine housing. For instance, the outer machine housing has an opening generally aligned with the mouth of the ingredient passage, the pivotable cover acting as a sliding gate between the mouth and the housing.

As illustrated in FIGS. 2 to 4, processing module 3 may have a first part 31 and a second part 32 movable relative to first part 31 from a position for housing therein ingredient 2, in particular an ingredient capsule 2, to a transfer position for inserting ingredient 2 into module 3 and/or for evacuation thereof from module 3.

For instance, at least one of first and second parts 31,32 is movable within the machine's frame or housing 10. For example, second part 32 bears front and rear arms or pinions 321,322 that are held on a support rail 13 and/or within support groove 14 of the frame or housing 10 and translationally movable thereon and/or therein for guiding second part 32 between the ingredient housing position and the transfer position.

At least one of first and second parts 31,32 can be connected to the pivotable cover 5 so that relative movement of the first and second parts causes movement of the pivotable cover, and/or vice-versa.

For instance, first and second parts 31,32 are connected to pivotable cover 5 by at least one of:

a data processing link, such as an electric control unit in particular a unit controlling at least one automatic actuator actuating at least one of the first and second parts and the pivotable cover, the actuator being optionally selected from electric, hydraulic and/or pneumatic actuators such as one or more electric motors;

a mechanical movement transmission 6, in particular comprising at least one of: gears, e.g. one or more wheels 61,62,63 and/or racks 60, such as spur and/or friction gears; cam followers and cams; cranks and crank shafts; and a magnetic movement transmission, in particular comprising an electromagnet and/or a permanent magnet.

Typically, a relative movement of first and second parts 31,32 into:

the ingredient housing position causes movement of pivotable cover 5 into its covering position (FIGS. 2 and 4), and/or vice versa; and/or the transfer position causes movement of the pivotable cover 5 into its uncovering position (FIGS. 1 and 3), and/or vice versa.

First and second movable parts 31,32 may be relatively moved manually e.g. via a handle, semi-automatically, e.g. a handle associated with an automatic return spring, and/or automatically, e.g. by an electric motor.

As illustrated in FIGS. 2 to 4, cover 5 may be associated with a wheel 63, e.g. a wheel 63 integral with cover 5 such as with cover periphery 54 and/or a spur wheel 63, that is in a pivotable-drive-relationship with movements of second part 32 translational relative to axis 51. Translational movements of second part 32 may be converted:

from a rack 60 fixed to or integral with translationally moving part 32;

via intermediate transmission 61,62, e.g. entry and exit wheels 61,62 of different radii fixed to each other for changing a movement and torque transmission ratio;

to wheel 63; or vice versa.

The driving force may be exerted on first and/or second parts 31,32 and transmitted to pivotable cover 5.

The driving force can be exerted on pivotable cover 5 and transmitted to first and/or second parts 31,32. Hence, a single actuator, e.g. manual or electric such as an electric motor, may be used to move first/second parts 31,32 and pivotable cover 5. For example, second part 32 is driven by an electric motor (not shown).

Cover 5 can be pivoted manually, semi-automatically and/or automatically. In particular, cover 5 can be associated with an automatic return device. This device can be configured for driving cover 5 into a stable position, in particular into the covering position and/or into the uncovering position. The automatic return device can be a bistable device for driving cover 5 into two different stable positions, in particular into the covering position (FIGS. 2 and 4) and into the uncovering position (FIGS. 1 and 3). The automatic return device may comprise an elastic arrangement, e.g. a spring arrangement such as compression and/or traction springs, that relaxes by reaching the stable position(s) and that is stressed into the unstable position.

Typically, machine 1 has a control unit, in particular a unit for controlling the ingredient processing module, as known in the art.

Such a control unit may comprise a power management module arranged to power the control unit and optionally further electric components, such as a user-interface and/or a thermal conditioner in particular a heater, when the control unit is unpowered or in standby state and the cover moved, in particular into the uncovering position.

Machine 1 typically include a user-interface, e.g. one or more interface devices, such as user-input devices, e.g. buttons, and/or output devices, e.g. LEDs.

In a particular embodiment, cover 5 may form a user-interface of machine 1, in particular a user-interface for controlling the ingredient processing module 3. Typically, processing module is associated with a control module to which the user-interface is connected, e.g. via sensors e.g. position sensors, such as one or more sensors selected from an electro-mechanical switch sensor, a magnetic sensor, an electromagnetic sensor and an optical sensor.

For instance, module 3 can be arranged to:
process ingredient 2 when cover 5 is pivoted into the covering position, in particular if an ingredient 2 is sensed in the module;
carry out a service process, e.g. rinsing or cleaning, and/or an shut down or standby process when cover 5 is pivoted into the covering position and no ingredient should be present in the module, e.g. no ingredient is detected in the module;
receive and/or evacuate ingredient 2 when cover 5 is pivoted into the uncovering position; and/or
interrupt processing of ingredient 2 when cover 5 is pivoted into an intermediate position between the covering and uncovering position.

Many alternatives and variations are of course possible regarding the user-control of machine 1, in particular via cover 5 as a user-interface and/or other user-interfaces.

Machine 1 may include a lock for locking cover 5 in its covering position when an ingredient 2 is being processed in the processing module 3, so that no accidental and/or inappropriate opening or closure can be provoked by a user during processing.

Cover 5 may be configured to interrupt ingredient processing in the module 3 when cover 5 is actuated away from the covering position.

Cover 5 may be arranged to confine fluid within ingredient passage 4. In particular, cover 5 is configured to:
extend beyond a periphery of the mouth 41 in the covering position; and/or
be movable out of the covering position only after a pressure release in the ingredient passage (4).

Machine 1 may have a collector receptacle (not shown) for collecting used ingredients, such as tea leaves or ground coffee, e.g. within used capsules, and waste liquid. Collector receptacle may be insertable, e.g. slidable, into a cavity 16 formed in machine 1 and removable therefrom for servicing, e.g. emptying the solids and/or liquids contained therein.

Further details of such a machine 1, in particular relating to the processing module, beverage outlet, control unit and the motorization are for example disclosed in EP 1 767 129 (also published as US 2013/032034) and PCT/EP11/071547 (also published as US 2013/0247775), which are hereby incorporated by way of reference.

The invention claimed is:

1. A machine for preparing a beverage from at least one ingredient, the machine comprising:
an ingredient processing module;
an ingredient passage having an ingredient mouth configured to insert along an insertion direction the at least one ingredient from outside the machine into the ingredient processing module; and
a cover configured to pivot between a first position covering the ingredient passage and a second position uncovering the ingredient passage, the cover is configured to pivot about a pivoting axis that is parallel to the insertion direction and/or that is perpendicular to a plane of the ingredient mouth of the ingredient passage, the pivoting axis extends through the cover, the cover has an outer periphery, and the machine comprises an outer housing in which the outer periphery of the cover rotates and remains in place within confines of the outer housing to move between the first position and the second position,
the ingredient processing module has a first part and a second part, the first and second parts are connected to the cover by a connection selected from the group consisting of:
a data processing link;
a mechanical movement transmission; and
a magnetic movement transmission, and
the second part is movable relative to the first part from a position for housing therein the at least one ingredient to a transfer position for inserting the at least one ingredient into the ingredient processing module and/or for evacuation thereof from the ingredient processing module.

2. The machine of claim 1, wherein the ingredient mouth and the ingredient passage are configured to receive and guide an ingredient capsule containing the at least one ingredient, the ingredient passage having a slide for guiding a guiding flange of the ingredient capsule to the ingredient processing module, and the ingredient processing module is configured to hold the ingredient capsule.

3. The machine of claim 1, wherein the cover has a planar portion at a plane of the cover, and the planar portion covers and uncovers the ingredient passage and is arranged to pivot in the plane of the cover.

4. A machine for preparing a beverage from at least one ingredient, the machine comprising:
an ingredient processing module, the ingredient processing module has a first part and a second part;
an ingredient passage having an ingredient mouth configured to insert along an insertion direction the at least one ingredient from outside the machine into the ingredient processing module; and
a cover configured to pivot between a first position covering the ingredient passage and a second position uncovering the ingredient passage, the cover is configured to pivot about a pivoting axis that is parallel to the insertion direction and/or that is perpendicular to a plane of the ingredient mouth of the ingredient passage, the pivoting axis extends through the cover, the cover has an outer periphery, and the machine comprises an outer housing in which the outer periphery of the cover rotates and remains in place within confines of the outer housing to move between the first position and the second position, the first and second parts are connected to the cover by a connection selected from the group consisting of: a data processing link; a mechanical movement transmission; and a magnetic movement transmission, and the second part is movable relative to the first part from a position for housing therein the at least one ingredient to a transfer position for inserting the at least one ingredient into the ingredient processing module and/or for evacuation thereof from the ingredient processing module, and the cover has a cover opening and is pivotable:

over the ingredient passage to permit insertion of the at least one ingredient through the cover opening into the ingredient processing module via the ingredient passage; and away from the ingredient passage to prevent insertion of the at least one ingredient through the cover opening into the ingredient processing module.

5. The machine of claim 1, wherein the cover is configured to:

receive the at least one ingredient when the cover is in the first position;

drive the at least one ingredient when the cover is moved from the first position to the second position; and release the at least one ingredient into the ingredient passage when the cover is in the second position.

6. The machine of claim 1, wherein the outer periphery of the cover is circular or partly circular.

7. The machine of claim 1, wherein the connection to the cover is such that relative movement of the first and second parts causes movement of the cover, and/or vice-versa.

8. The machine of claim 7, wherein the position for housing causes movement of the cover into the first position, and/or vice versa; or the transfer position causes movement of the cover into the second position, and/or vice versa.

9. The machine of claim 1, wherein the first and second parts are relatively movable semi-automatically and/or automatically.

10. The machine of claim 1, wherein the cover is configured to pivot semi-automatically and/or automatically.

11. The machine of claim 1, wherein the cover forms a user-interface configured to control the ingredient processing module.

12. The machine of claim 1, further comprising a lock configured to lock the cover in the first position when the at least one ingredient is being processed in the ingredient processing module.

13. The machine of claim 1, wherein the cover is configured to interrupt ingredient processing in the ingredient processing module when the cover is actuated away from the first position.

14. The machine of claim 1, wherein the cover is arranged to confine fluid within the ingredient passage.

15. The machine of claim 4, wherein the cover opening has a shape of an ingredient capsule in a position for insertion along the insertion direction, the ingredient capsule containing the at least one ingredient.

16. The machine of claim 1, wherein the cover defines a capsule seat to receive the at least one ingredient when the cover is in the first position and drive the at least one ingredient into the ingredient passage.

17. The machine of claim 1, wherein the mechanical movement transmission comprises a first wheel engaged with a second wheel, and the second wheel is engaged with a rack integral with or fixedly connected to the second part of the ingredient processing module such that translational movement of the second part is converted between the rack and the first wheel by the second wheel.

* * * * *